(12) United States Patent
Madeleine et al.

(10) Patent No.: US 8,992,198 B2
(45) Date of Patent: Mar. 31, 2015

(54) APPARATUS FOR PREPARING PELLETS OF POLY(TRIMETHYLENE TEREPHTHALATE)

(75) Inventors: Dennis Gerard Madeleine, Wilmington, DE (US); Michael Joseph Molitor, Wilmington, DE (US); John Harvey Eng, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/405,387

(22) Filed: Feb. 27, 2012

(65) Prior Publication Data

US 2013/0059023 A1 Mar. 7, 2013

Related U.S. Application Data

(60) Provisional application No. 61/447,875, filed on Mar. 1, 2011, provisional application No. 61/447,868, filed on Mar. 1, 2011.

(51) Int. Cl.
*B29B 9/06* (2006.01)
*B29C 47/88* (2006.01)
*B29C 47/00* (2006.01)
*B29C 47/30* (2006.01)

(52) U.S. Cl.
CPC .............. *B29B 9/06* (2013.01); *B29C 47/0011* (2013.01); *B29C 47/0066* (2013.01); *B29C 47/30* (2013.01); *B29C 47/8895* (2013.01)
USPC .............. 425/71; 425/308; 425/404; 425/445

(58) Field of Classification Search
USPC .......................... 425/67, 68, 71, 308, 404, 445
See application file for complete search history.

(56) References Cited

U.S. PATENT DOCUMENTS

| | | | |
|---|---|---|---|
| 3,608,001 A * | 9/1971 | Kowalski et al. | ............ 264/40.6 |
| 5,242,289 A | 9/1993 | Forgash et al. | |
| 6,159,406 A | 12/2000 | Shelby et al. | |
| 6,297,315 B1 | 10/2001 | Duh et al. | |
| 2009/0057935 A1 | 3/2009 | Sato et al. | |
| 2009/0057936 A1 | 3/2009 | Hanimann et al. | |

FOREIGN PATENT DOCUMENTS

| | | |
|---|---|---|
| DE | 10129756 C1 | 9/2002 |
| DE | 102006058811 A1 | 6/2008 |
| DE | 102007022743 A1 | 11/2008 |
| JP | 7223221 A | 8/1995 |

OTHER PUBLICATIONS

International Search Report dated Jun. 14, 2012, International Application No. PCT/US2012/027229.

* cited by examiner

*Primary Examiner* — James Sanders
*Assistant Examiner* — Joseph Leyson

(57) ABSTRACT

An apparatus is described having an extrusion means for extruding a molten polymer strand; a pelletizer; and a trough disposed to convey a polymer strand from the extrusion means to the pelletizer; the trough has an interior bottom surface; a water dispensing means disposed to provide a layer of water on a first portion of the interior bottom surface that is proximate to the extrusion means; a mesh or perforated surface disposed in the trough downstream from the water dispensing means, disposed to permit the separation of water from a water-immersed strand incident upon it; and a second portion of the interior bottom surface downstream from that mesh or perforated surface, disposed to contain a layer of water.

5 Claims, 2 Drawing Sheets

APPARATUS FOR PREPARING PELLETS OF POLY(TRIMETHYLENE TEREPHTHALATE)

This application claims benefit of U.S. Provisional 61/447,868, filed Mar. 1, 2011, and U.S. Provisional 61/447,875, filed Mar. 1, 2011, which are herein incorporated by reference.

FIELD OF THE INVENTION

The present invention relates to relates to a quench apparatus for quenching extruded polymer strands.

BACKGROUND OF THE INVENTION

Polytrimethylene terephthalate (PTT) is prepared by the polycondensation reaction of 1,3-propanediol with terephthalic acid or terephthalic acid esters. PTT polymer and copolymers thereof are finding ever increasing commercial use in the preparation of fibers, fabrics, carpets, films, molded parts and the like.

Standard practice in the polymer art is to manufacture thermoplastic polyesters in a "continuous polymerizer" extruding the produced molten polymer though an extruder equipped with a so-called "strand die" which is simply a metal plate having one or more about ⅛-¼" circular cross-section holes in it. A continuous strand, about ¹⁄₁₀-⅛" in diameter, of molten thermoplastic polymer is extruded out of each hole of the strand die. Immediately upon discharge from the strand die, the hot strand is usually passed through a water quench region normally consisting of a water quench tank or a water spray chamber. The length of the quench region is largely dependent upon the linear rate of extrusion of the strand—that is, how fast the strand is moving—and the melt temperature of the strand at the exit of the die. At the end of the quench region, the strand is separated from the water, and is directed to a cutter that cuts the strand into pellets about ⅛" long.

This practice, developed for poly(ethylene terephthalate) (PET), has been applied to poly(trimethylene terephthalate) (PTT). Because of the rapid quenching of the strand, the resulting pellets tend to exhibit amorphous (that is, non-crystalline) surfaces. This is not a problem in PET because the glass transition temperature is sufficiently high that the amorphous surfaces remain solid until the pellet is further melt processed. PTT exhibits a glass transition temperature ($T_g$) of about 45° C.—much lower than that of PET and other well-known polyesters such as PBT or PEN. It has been found that when PTT pellets prepared by the process described supra are stored where the ambient temperature reaches about 40° C., some degree of surface polymer flow may occur on a microscopic scale, thereby causing stored pellets to stick together, forming aggregates that hinder the smooth flow of pellets during processing. By inducing surface crystallization, pellets can be produced that exhibit greatly reduced sticking and aggregation when subject to relatively high storage temperatures.

Hanniman et al., US2009/0057935, discloses a process for producing a non-adhering granule from a polyester above $T_g$ by introducing a granulated material into cooling water at 80-110° C., where the granulated material is prepared from a melt and fed to an underwater melt cutter.

Duh et al., U.S. Pat. No. 6,297,315, discloses a process for crystallizing PTT before pelletizing by immersing the quenched strand into a water batch heated to 60-100° C. Duh teaches that best results are obtained by crystallization after pelletization. Further, according to Duh, a water temperature of 60° C. requires a 20 minute crystallization time to achieve satisfactory results. This is because, as Duh shows, 60° C. is below the crystallization temperature of about 69° C.

Nishiyama et al, JP7223221 (A) (abstract only), discloses a process suitable for use with a polyester having a $T_g$ less than 40° C. in which a molten strand is quenched, then subject to stretching to induce crystallization therein, followed by pelletization.

Shelby et al., U.S. Pat. No. 6,159,406, discloses a process for crystallizing difficult to crystallize polyester melts before pelletizing by quenching the strand, and then stretching the strand by winding on two sets of godets separated by a hot water bath set above $T_g$ through which the strand passes.

SUMMARY OF THE INVENTION

The invention provides an apparatus comprising
an extrusion means for extruding a molten polymer strand;
a pelletizer; and,
a trough disposed to convey a polymer strand from the extrusion means to the pelletizer; the trough comprising
an interior bottom surface;
a water dispensing means disposed to provide a layer of water on a first portion of the interior bottom surface that is proximate to the extrusion means;
a mesh or perforated surface disposed in the trough downstream from the water dispensing means, disposed to permit the separation of water from a water-immersed strand incident upon it;
and,
a second portion of the interior bottom surface downstream from that mesh or perforated surface, disposed to contain a layer of water.

DETAILED DESCRIPTION OF THE INVENTION

Figure 1A:
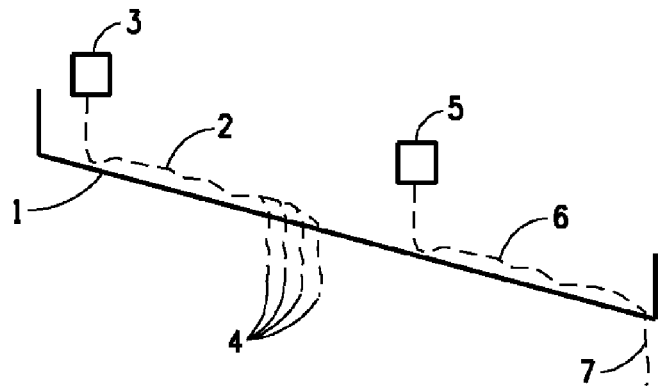
FIG. 1a illustrates a side longitudinal cross-sectional view of a trough in an embodiment of the invention wherein the trough comprises a plurality of perforations in the interior bottom surface thereof.

When a range of numerical values is provided herein, it is intended to encompass the end-points of the range unless specifically stated otherwise. Numerical values used herein have the precision of the number of significant figures provided, following the standard protocol in chemistry for significant figures as outlined in ASTM E29-08 Section 6. For example, the number 40 encompasses a range from 35.0 to 44.9, whereas the number 40.0 encompasses a range from 39.50 to 40.49.

Described herein is a process comprising:
(a) preparing a molten strand of a poly(trimethylene terephthalate) composition wherein the strand has a surface and an interior;
(b) contacting the molten strand with water in a first quench region for a sufficient period of time so that the surface of the molten strand solidifies and at least a preponderant portion of the interior remains above the cold crystallization temperature of the poly(trimethylene terephthalate) composition, thereby preparing a surface-solidified strand;
(c) separating the surface-solidified strand from the water;
(d) exposing the surface-solidified strand to ambient air in an annealing region for a sufficient period of time to induce cold crystallization on the surface of the strand producing a surface-crystallized strand;
and
(e) contacting the surface-crytallized strand with water in a second quench region for a sufficient period of time to solidify the interior of the strand.

The object of the process is to create a radial temperature gradient in the extruded strand in a direction normal to the direction of motion thereof (that is, normal to the longitudinal direction thereof) so that upon exiting the first quench region the surface of the strand has solidified while at least the preponderant portion of the interior of the strand remains above the cold crystallization temperature, $T_{cc}$. "Preponderant portion" shall mean at least 50% of the interior of the strand. Then, in the annealing region, heat from the warmer interior will be transferred to the cooler surface, causing the surface to undergo crystallization. Once the surface has undergone crystallization, the still warm strand can then be thoroughly quenched in the second quench region so that the strand will be ready for pelletization, accumulation or other handling step.

In the art of thermal analysis, $T_g$ and $T_{cc}$ refer to specific temperatures determined according to specified methods from, for example, differential scanning calorimetry data. However, the average practitioner of the art understands that these temperatures so determined lie within a range of several degrees that define the transition to which they refer. Thus, for example, cold crystallization will occur over a range of several degrees, but the rate under one set of standard test conditions, reaches a maximum at $T_{cc}$.

The critical temperatures referred to, namely the glass transition temperature ($T_g$) and the cold crystallization temperature ($T_{cc}$) are known to shift somewhat depending upon the specific components of the PTT composition hereof. For example, $T_g$ and $T_{cc}$ are both known to vary depending upon the type and concentration of comonomer in the polymer.

While $T_g$ and $T_{cc}$ have clear and precise scientific definitions, they are defined phenomenologically for the purposes of the present invention, without reference to an actual temperature reading. $T_g$ is defined as that temperature above which polymer molecules exhibit sufficient mobility so that pellet sticking behavior can occur. $T_{cc}$ is defined for the purposes of the present invention as that temperature at which the surface of the strand undergoes crystallization at a maximum rate while in the annealing region.

It is not necessary to actually measure $T_g$ and $T_{cc}$ as herein defined. When the molten polymer strand is extruded, it is, by definition, above both $T_g$, $T_{cc}$, and the crystalline melting point of the polymeric composition. When the molten strand exits the first quench region according to the process, it is clear to a practitioner that the surface has solidified and is no longer molten. Moreover, the surface-hardened strand must have sufficient strength to resist breakage under tension.

On the other hand, if the surface of the strand has not become at least partially crystallized upon exiting the annealing region, a practitioner can conclude that the residence time in the first quench region was too long, so that the temperature of a preponderant portion of the interior had been reduced to below $T_{cc}$.

Suitable for the practice of the process are homopolymers of PTT and copolymers thereof comprising at least 70% of monomer units of trimethylene terephthalate. Polymers suitable for the practice of the present invention can contain up to 25% by weight of various additives as are commonly incorporated into polymers to impart additional functionality. Such additives include but are not limited to UV stabilizers, inorganic fillers, antistats, pigments, and flame retardants. Any suitable PTT composition must exhibit cold crystallization in order to be operable in the process hereof. In an embodiment, the PTT composition comprises PTT homopolymer.

The strand is a moving strand. That is, any arbitrarily selected point on the strand undergoes continuous translation away from the strand die in a direction parallel to the longitudinal axis of the strand. Taken in its entirety at any given moment in time, the strand extends from the die to the pelletizer. However, for the purposes of describing the process, the term "strand" shall also be understood to refer to any appropriate segment of the extruded strand, of any length. For example, when the text refers to contacting the strand with water, it shall be understood that at any given moment in time, a segment of the strand, shorter in length than the entire strand, is undergoing water contact.

As used in the description, the term "residence time" shall refer to that period of time in which an arbitrarily selected point along the strand spends traversing a particular region as defined herein. The term "the residence time of the strand" shall be understood to mean the residence time of an arbitrary point along the strand.

In one embodiment, the extrudate consists of a single strand. In an alternative embodiment, the extrudate comprises a plurality of strands.

The residence time of the strand in the first quench region is sufficient to reduce the temperature of the surface to a temperature where the surface is solid and has sufficient strength to resist breakage upon tension, but insufficient to cause at least a preponderant portion of the interior to fall below the cold crystallization temperature of the poly(trimethylene terephthalate) composition. In one embodiment, the residence time of the strand in the first quench region lies in the range of 0.2 to 2 sec. In a further embodiment, the residence time of the strand in the first quench region lies in the range of 0.3 to 1.0 sec.

Further, the strand exits the first quench region and enters the annealing region where the surface undergoes reheating at least to $T_{cc}$ by the latent heat remaining in the interior of the strand. The residence time of the strand in the annealing region is sufficient to induce crystallization on the surface of the strand. In one embodiment, the residence time of the strand in the annealing region is in the range of 0.3 to 5 sec. In a further embodiment, the residence time of the strand in the annealing region lies in the range of 0.5 to 2.5 sec.

Further, following the annealing region, the strand is passed through a second water quench region for a period of time sufficient to further solidify the interior of the strand. In one embodiment, the residence time in the second quench region lies in the range of 1 to 10 sec. In a further embodiment the residence time in the second quench region lies in the range of 1.5 to 3.5 sec.

In one embodiment, the water temperature, $T_w$, in the first and second quench regions is, independently, in the range of $0°C.<T_w<60°C$. In a further embodiment, $20°C.\leq T_w \leq 50°C$. In a still further embodiment, $35°C.\leq T_w \leq 45°C$.

The water quench may be effected by any means known to be acceptable in the art. In one embodiment, water quenching is effected by immersing the strand in a water bath. In an alternative embodiment, the water quenching is effected by passing the strand through a water spray. In one embodiment of the process hereof, the water quench is effected by same means in both the first and second quench regions. In an alternative embodiment, the water quench is effected by different means in the first and second quench regions.

According to the invention, as the strand exits the first quench region and enters the annealing region, it must be separated from residual quench water residing on or entrained with the strand surface. Any convenient means for so separating is satisfactory, including air jet drying, draining through drain holes, passing over a dessicant bed, and the like. While it is not necessary for the strand to be bone dry, it is necessary for the proper crystallization of the surface to replace the high heat capacity liquid water on the strand surface with low heat capacity air.

Following quenching in the second quench region, the strand can be further processed. In one embodiment, the strand is fed to a pelletizer for cutting into pellets that are well-suited for production of fiber, film, and injection molded parts, among other uses. In an alternative embodiment, the strand itself may be collected in bulk.

An apparatus is described comprising
an extrusion means for extruding a molten polymer strand;
a pelletizer; and,
a trough disposed to convey a polymer strand from the extrusion means to the pelletizer; the trough comprising an interior bottom surface;
   a water dispensing means disposed to provide a layer of water on a first portion of the interior bottom surface that is proximate to the extrusion means;
   a mesh or perforated surface disposed in the trough downstream from the water dispensing means, disposed to permit the separation of water from a water-immersed strand incident upon it;
   and,
   a second portion of the interior bottom surface downstream from that mesh or perforated surface, disposed to contain a layer of water.

The extrusion means suitable is not critical so long as it results in the extrusion of a molten strand. Suitable means include screw-type extruders, Farrell continuous mixers, gear pumps, so-called continuous polymerizers, screw pumps, hydraulic pumps and the like. Any of these extrusion means is employed herein to feed a strand die from which can be extruded a molten strand, according to the invention.

Any pelletizer designed for pelletizing polymer strands is suitable for use in the present invention. Pelletizers are well known in the art, and are widely available commercially from many sources.

The trough is disposed to define a path between the strand die and the pelletizer, conveying therethrough the strand from strand die to pelletizer. For the purposes of the present invention, the term "downstream" refers to the relative position with respect to the path from the strand die to the pelletizer. For example, a second position along the path is to be further downstream than a first position if the second position is further from the strand die and closer to the pelletizer than is the first position. The trough provides the means for quenching the strand according to the process of the invention.

A suitable trough can be made of any water impermeable material, including but not limited to metal, ceramic, or plastic. In a typical embodiment hereof, the trough is made from metal, typically aluminum. The trough is designed to hold a layer of water, into which the strand is immersed according to the process of the invention.

The trough comprises a water dispensing means that is disposed to dispense water into a first portion of the interior bottom surface of the trough where that first portion is proximate to, and generally as close as possible, to the strand die so that the molten strands can be immersed in as short a time as possible after exiting the strand die. Suitable water dispensing means can be any that are known in the art. Suitable water dispensing means can be water sprays, water pumps, hoses or tubes any of which can be connected to a water tap or reservoir.

The trough further comprises a mesh or perforated surface downstream from the first portion of the trough, the mesh or perforated surface disposed to separate the water from a water immersed strand that is exiting the first portion of the trough, according to the process hereof. In one embodiment, the mesh can be any material that forms a mesh, grid, or netting that allows water to pass through. It is typically made of a non-water absorbing material such as metal, ceramic, or plastic.

In an alternative embodiment, the perforated surface comprises a plurality of perforations in the interior bottom surface of the trough itself. In a further embodiment, the trough further comprises a series of cover plates that can be used to cover the perforations on the exterior bottom surface of the trough, thereby adjusting the length of the perforated surface.

In either embodiment, the water entrained by the strand in the process of the invention is able to drain off through the perforations or mesh, allowing the segment of the strand traversing this portion to undergo annealing in air according to the process hereof.

The trough further comprises a second portion of the interior bottom surface that is disposed to contain a layer of water, this for the final quench in the process hereof. In one embodiment, wherein the mesh or perforated surface comprises a raised structure that resides above the water level, only a single water dispensing means is necessary since the water can flow freely underneath the elevated mesh or perforated surface. In an alternative embodiment, wherein the perforated surface is a portion of the interior bottom surface itself, the water input in the first portion proximate to the strand die will drain out the holes in the bottom of the trough, unless it is saved by inserting a system of baffles and gutters to direct the water to the second portion, downstream from the mesh or perforated surface. Alternatively, the water required for the second portion can be supplied by a second water dispensing means that can be any of those suitable for the first water dispensing means.

FIG. 1a is a side longitudinal cross-sectional schematic view of an embodiment of the invention wherein the trough comprises a plurality of perforations in the interior bottom surface thereof. The metal trough, 1, is disposed so that water, 2, dispensed from a first dispensing means, 3, forms a layer flowing downstream, and then draining through a plurality of drain holes, 4, on the interior bottom surface of the trough (not shown). A second water dispensing means, 5, is disposed to dispense water, 6, to form a second water layer flowing downstream to a drainage hole, 7, (not shown) in the downstream end of the trough.

Figure 1B:
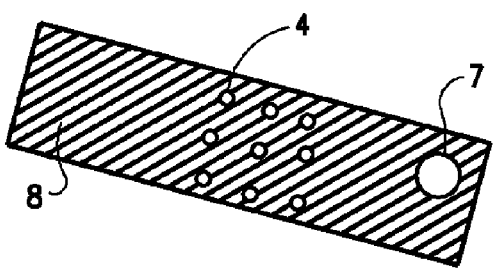
FIG. 1b illustrates a bottom view of the trough shown in FIG. 1a, showing the plurality of perforations downstream from the first portion, and a large drainage hole in the furthest downstream portion.

FIG. 1b is a view of the exterior bottom, 8, of the trough shown in FIG. 1a, showing the plurality of perforations, 4, downstream from the first portion, and the larger drainage hole, 7, in the furthest downstream portion.

Figure 2:
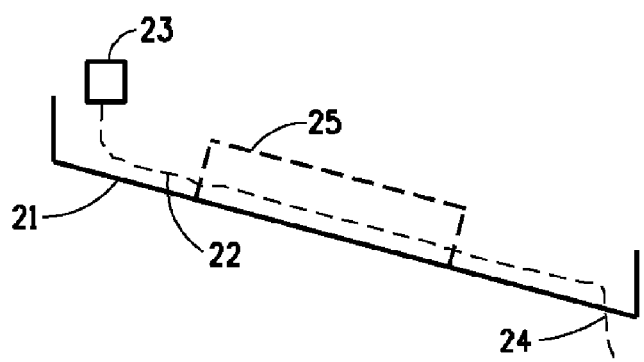
FIG. 2 illustrates a side longitudinal cross-sectional view of the trough in an embodiment of the invention wherein the trough interior bottom does not have perforations downstream from the first portion of the trough so that water introduced at the portion closest to the strand die can flow unimpeded to the drainage hole at the end of the trough. Instead, in this embodiment, the trough is provided with a raised wire mesh portion that is disposed just above the water.

FIG. 2 is a side longitudinal cross-sectional schematic view of the trough, 21, in an embodiment of the invention wherein the trough interior bottom does not have perforations downstream from the first portion of the trough so that water, 22, dispensed by a water dispensing means, 23, introduced at the portion closest to the strand die can flow unimpeded to the drainage hole, 24, at the end of the trough. Instead, in this embodiment, the trough is provided with a raised wire mesh portion, 25, that is disposed just above the water.

The invention is further described in but not limited to the following specific embodiments.

EXAMPLES

Figure 3:
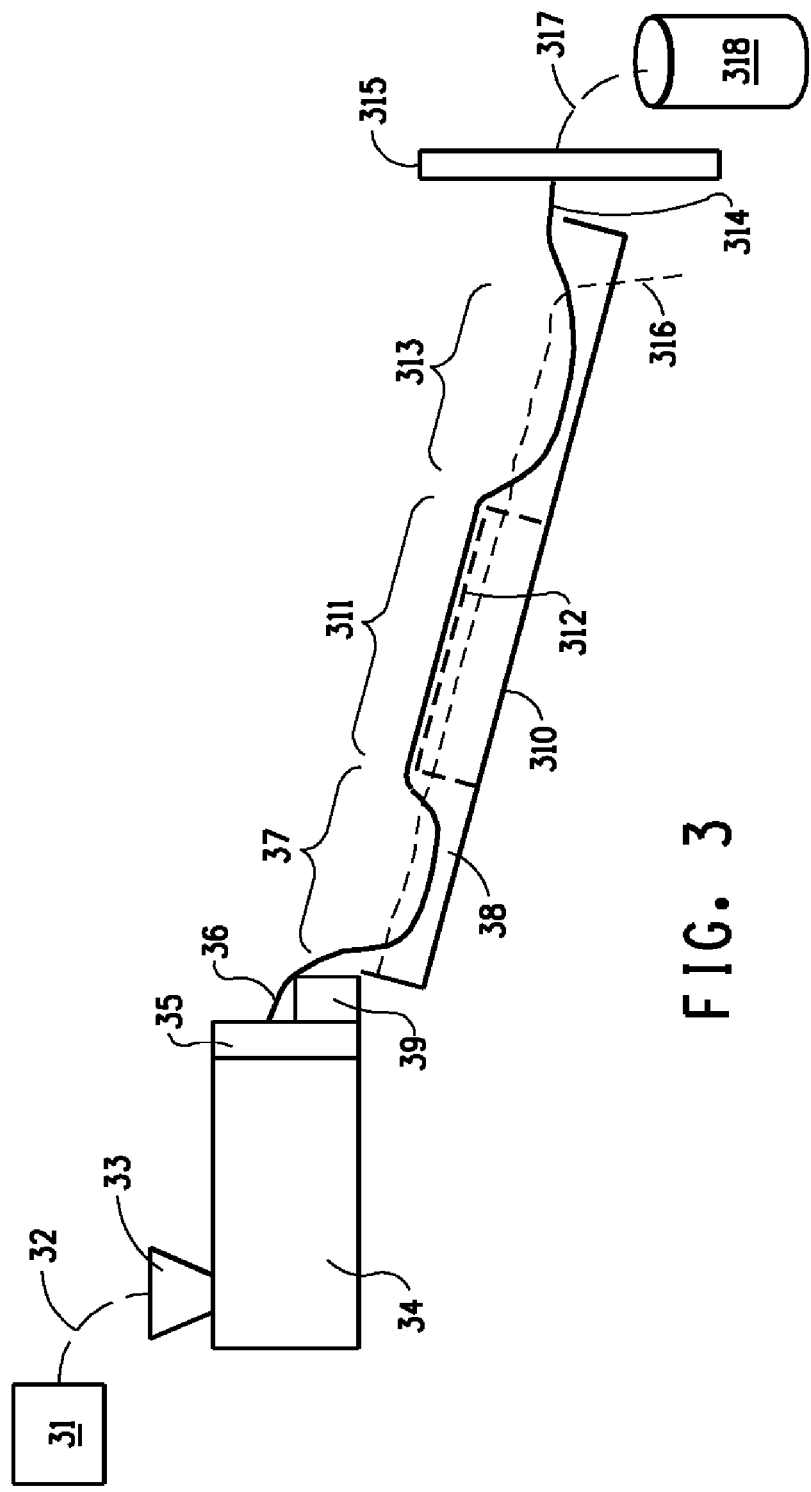
FIG. 3 illustrates a representation of an embodiment of the apparatus and process of the invention that was employed in the Examples, infra.

FIG. 3 is a schematic depiction of the apparatus in the Examples hereof. A K-Tron® Loss in Weight feeder, 31, was used to feed pellets, 32, of DuPont Sorona® J1141 (1.02 dL/g IV, available from the DuPont Company) to the feed throat, 33, of a 40 mm Werner and Pfleiderer co-rotating twin screw extruder, 34, at a rate of 296 lbs/hour. In the extruder the pellets were melted and the resulting melt conveyed to an 8-hole strand die, 35, from which 8 strands, 36, were extruded (only one is shown), moving at 93 cm/sec. The 40 mm extruder was characterized by a barrel length of 1780 mm and L/D=45. The extrusion conditions are shown in Table 1:

TABLE 1

| Feed Barrel 1 | Set Point Cold water | Actual |
|---|---|---|
| Barrell 2 | 220° C. | 221° C. |
| Barrell 3 | 220° C. | 221° C. |
| Barrell 4 | 220° C. | 244° C. |
| Barrell 5 | 220° C. | 233° C. |
| Barrell 6 | 220° C. | 238° C. |
| Barrell 7 | 220° C. | 240° C. |
| Barrell 8 | 220° C. | 258° C. |
| Barrell 9 | 220° C. | 254° C. |
| Barrell 10 | 220° C. | 255° C. |
| Barrell 11 | 220° C. | 219° C. |
| Die | 220° C. | 227° C. |
| Screw speed | | 395 RPM |
| Die Pressure | | 290 psi |
| Vacuum | | 25.0 in. H$_2$O |
| Feeder speed | | 293 lb/hr |
| Extrudate melt | | 269° C. |

Within about 3 in. from exiting the die, 35, the molten strand, 36, was directed using guides (not shown) through the first quench region, 37, by immersion in 11° C. water, 38, dispensed from a water shower, 39, contained in a 12 foot long water trough, 310. The strand exited the first quench region, 37, into the annealing region, 311, and was conveyed over a wire mesh, 312, elevated above the water, 38. Following the annealing region, 311, the strand was passed into the second quench region, 313, using guides (not shown) from which the quenched strand, 314, was fed to a pelletizer, 315, while the water drained out by a drain hole, 316 (not shown). The pelletizer, 315, chopped the strand into pellets, 317, about 1/8 inch in length, and the pellets were collected in a collection can, 318.

The residence time of the strand in the annealing region was varied by making small adjustments in the length of the wire mesh, 312. The residence time was calculated from the calculated rate of speed of the strand based on mass flow, pellet diameter and density and the actual distance traversed by the strand.

The densities of the pellets prepared under each set of conditions were determined from He pycnometry.

A 23 g aliquot of pellets from each test condition was placed in a 7 cm diameter aluminum pan. A sheet of aluminum foil was placed over the pan, and the covered pan was placed in a temperature-controlled hydraulic press at 40° C. and 18.5 kPa for 24 hours. After 24 hours, the pan was removed and the pellets that had aggregated to one another were removed by hand, and weighed. The percentage of the weight of the original 23 g aliquot that had aggregated was recorded as the "% sticking."

Comparative Example A represents the standard practice in the art adapted from the process for pelletizing PET.

Comparative Example B represents a condition in which the residence time in the annealing region was insufficient.

TABLE 2

| | Residence Times (sec) | | | |
|---|---|---|---|---|
| | First Quench Region | Annealing Region | Density (g/cc) | Sticking (%) |
| CE A | all under-water | 0 | 1.308 | 42 |
| CE B | 0.35 | 1.08 | 1.310 | 43 |
| Ex 1 | 0.35 | 1.22 | 1.312 | 17 |
| Ex 2 | 0.35 | 2.19 | 1.314 | 2 |
| Ex 3 | 0.35 | 2.51 | 1.337 | 0 |

We claim:

1. An apparatus comprising
   (a) an extrusion means for extruding a molten polymer strand;
   (b) a pelletizer; and, disposed between said extrusion means and said pelletizer
   c) a single downward inclined trough, said trough having a plurality of regions comprising
      i) a first quench region proximate to and downstream from said extrusion means, said first quench region comprising
         (A) a first trough segment; and,
         (B) a water dispensing means disposed to provide water to said trough segment;
      ii) an annealing region downstream from and proximate to said first quench region, said annealing region comprising a mesh or perforated surface disposed just above the water surface to permit the separation of water from a water-immersed polymer strand incident upon it; said mesh or perforated surface disposed such that the water so separated will flow through the mesh or perforated surface back into said trough; said mesh or perforated surface having an adjusted length to provide a strand residence time of 0.3 to 5 seconds upon said mesh or perforated surface. and,
      iii) a second quench region downstream from said annealing region, said second quench region comprising a second trough segment disposed to contain a layer of water.

2. The apparatus of claim 1 wherein the extrusion means is a screw-type extruder.

3. The apparatus of claim 1 wherein the extrusion means is a continuous polymerizer.

4. The apparatus of claim 1 wherein the water dispensing means is selected from any one of water spray, water pump, hose and tube.

5. The apparatus of claim 1 wherein the second quench region comprises a second water dispensing means.

* * * * *